3,557,177
PROCESS FOR PRODUCING CYCLOSILOXANES
Terry G. Selin, 2279 Dean St.,
Schenectady, N.Y. 12309
No Drawing. Continuation of application Ser. No.
406,900, Oct. 27, 1964. This application Sept. 22,
1969, Ser. No. 863,674
Int. Cl. C07f 7/08
U.S. Cl. 260—448.2     5 Claims

ABSTRACT OF THE DISCLOSURE

A process for forming cyclopolysiloxanes useful in the formation of higher molecular weight silicones comprises reacting a silanol chain-stopped diorganopolysiloxane, such as tetraphenyldisiloxanediol with a halogen-terminated diorgano-silicon compound, such as dimethyldichlorosilane, in the presence of ammonia and a solvent.

---

This application is a continuation of application Ser. No. 406,900 filed Oct. 27, 1964, now abandoned.

This invention relates to a process for forming cyclopolysiloxanes. More particularly, it relates to a process for forming cyclopolysiloxanes utilizing ammonia as an acid acceptor.

One method of forming cyclotrisiloxanes involves the reaction of a tetraorganodisiloxanediol with a diorganodihalosilane. In order to prevent the formation of undesirable by-products, it is always necessary that some agent be present during the reaction of the siloxanediol and the halosilane to remove the hydrogen halides generated by the reaction. One recognized method for forming cyclotrisiloxanes has been the reaction of a diorganodichlorosilane and a tetraorganodisiloxanediol in the presence of a tertiary amine. The tertiary amine absorbs the hydrogen chloride generated in the reaction and prevents the formation of undesired by-products. More recently, it has been shown that organic amines other than tertiary amines form complexes with materials such as tetraphenyldisiloxanediol-1,3 [HO($C_6H_5$)$_2$SiOSi($C_6H_5$)$_2$OH] and that these complexes are also useful in preparing cyclopolysiloxanes.

Ammonia is not normally used in reactions involving organochlorosilanes because of the formation of silazanes [≡Si—N=]. However, the use of ammonia in situations formerly demanding amines would provide a significant cost savings due to the ready availability and low price of ammonia in comparison with these amines.

Unexpectedly, I have found that a limited class of chloro-containing organosilicon compounds may be reacted in the presence of ammonia without the formation of undesirbale silazanes. Further, these chloro-compounds may be reacted with organosiloxanediols to form cyclopolysiloxanes when ammonia is present to absorb and react with the hydrogen chloride generated by the reaction. The result of the reaction is not only a cyclopolysiloxane free of undesired by-products which might have been caused by the hydrogen chloride generation, but, when ammonia is used as the acid acceptor, the hydrogen chloride reaction product is more readily removable than when using the amines of the prior art.

Thus, briefly, the present invention provides a process for the formation of cyclotrisiloxanes and cyclotetrasiloxanes through the reaction of an organosiloxanediol and a chloro-substituted organosilicon compound in the presence of ammonia as the acid acceptor. The reaction is conducted in the presence of a solvent to aid in reaction control.

The product formed by the process of the present invention has the formula:

(1)
$$\left[\begin{array}{c} R \\ | \\ -Si-O- \\ | \\ R \end{array}\right]_a \left[\begin{array}{c} R' \\ | \\ -Si-O- \\ | \\ R' \end{array}\right]_b$$

where each R is independently selected from the class consisting of aryl radicals and substituted aryl radicals, each R' is independently selected from the class consisting of alkyl radicals, aryl radicals, and substituted aryl and alkyl radicals, $a$ is an integer of from 2 to 3, inclusive, $b$ is an integer of from 1 to 2, inclusive, and the sum of $a$ and $b$ is an integer of from 3 to 4, inclusive. Further, as indicated by Formula 1, the groups having the formula:

$$\left[\begin{array}{c} R \\ | \\ -Si-O- \\ | \\ R \end{array}\right]$$

are adjacent each other, and when two groups of the formula:

$$\left[\begin{array}{c} R' \\ | \\ -Si-O- \\ | \\ R' \end{array}\right]$$

are present, they are also adjacent each other.

The product is formed by the reaction, in a solvent solution of a siloxanediol having the formula:

(2)
$$HO-\left[\begin{array}{c} R \\ | \\ Si-O \\ | \\ R \end{array}\right]_a -H$$

and a chloro-compound having the formula:

(3)
$$X-\left[\begin{array}{c} R' \\ | \\ Si-O \\ | \\ R' \end{array}\right]_c \begin{array}{c} R' \\ | \\ Si-X \\ | \\ R' \end{array}$$

where R, R', and $a$ are as defined above, X is halogen, and $c$ is an integer of from 0 to 1, inclusive. The process may be represented by the following general equation:

$$HO\left[\begin{array}{c} R \\ | \\ Si-O \\ | \\ R \end{array}\right]_a H + X\left[\begin{array}{c} R' \\ | \\ Si-O \\ | \\ R' \end{array}\right]_c \begin{array}{c} R' \\ | \\ Si-X \\ | \\ R' \end{array} + 2\,NH_3 \xrightarrow{\text{solvent}}$$

$$\left[\begin{array}{c} R \\ | \\ -Si-O- \\ | \\ R \end{array}\right]_a \left[\begin{array}{c} R' \\ | \\ -Si-O- \\ | \\ R' \end{array}\right]_b + 2NH_4Cl$$

where R, R', $a$, $b$ and $c$ are as previously defined.

Exemplary of the radicals which R in the Formulas 1 and 2 can represent are aryl radicals, such as phenyl, naphthyl, biphenylyl, tolyl, xylyl, ethylphenyl, etc. Among the substituted aryl radicals which R can represent are those having cyano and halogen substituents such as chlorophenyl, dibromophenyl, p-cyanophenyl, etc. The R' members of Formulas 1 and 3 can be the same radicals as described for R and, in addition, can be alkyl radicals, e.g., methyl, ethyl, propyl, octyl, octadecyl, etc. including cycloalkyl and substituted alkyl radicals such as, e.g., cyclohexyl, cycloheptyl, cyclopentyl, cyanoethyl, chloropropyl, etc. Additionally, R' can represent aralkyl radicals such as benzyl, phenethyl, etc.

As mentioned, the process is carried out by reacting the siloxanediol of Formula 2 and the chloro-compound of Formula 3 in the presence of ammonia in a solvent solution. However, the order of addition of the reactants is critical so as to prevent the formation of the undesired silazanes and allow the reaction to proceed. The preferred order of addition is to place the particular chlorosilane or chlorosiloxane of Formula 3 and the siloxanediol of Formula 2 in the solvent which is to be used and subsequently add gaseous ammonia. If desired, the siloxanediol alone can be placed into the solvent, the solution permeated, though not necessarily saturated, with ammonia, and the chloro-compound added slowly to the ammonia-siloxanediol solution. Although not insoluble from the solution, it is probable that the ammonia forms a complex with the siloxanediol during the reaction which aids in the interaction of the diol with the chloro-compound.

The ratio of the siloxanediol of Formula 2 to the chloro-compound of Formula 3 should be in the range of from the stoichiometric ratio of 1:1 to an excess of 10% of the diol based on the stoichiometric ratio. Preferably, the siloxanediol should be present in an amount about 1% in excess of the stoichiometric requirements of the reaction so as to prevent the generation of silazanes. An excess of the chloro-compound will result in generation of silazanes rather than production of the desired cyclopolysiloxane.

The solvent in which the reaction is carried out should be an anhydrous organic solvent, preferably benzene, toluene, xylene, and hydrocarbon solvents generally. Ethers and chlorinated hydrocarbons can also be used, but the results obtained are inferior to those realized using the previously mentioned hydrocarbon solvents. More generally, any organic solvent which is inert to the reactants under the conditions of the reaction can be used by the process of the present invention. The concentration of the reactants, that is, the siloxanediol and the chloro-compound, should be in the range of from 0.1 to 2.0 moles of reactant per liter of solvent. A higher concentration of reactant results in a lower yield of the finally desired cyclopolysiloxane. On the other hand, while dilute solutions may result in higher yields, when the concentration is diminished below 0.1 mole per liter, the higher yield is offset by the excessive amounts of solvent which must be removed from the final reaction mixture.

The concentration of ammonia in the reaction mixture cannot be stated with certainty due to the limited solubility of ammonia in any of the mentioned solvents. However, except when the chloro-compound is added to the ammonia-siloxanediol mixture, the concentration of ammonia is not critical. Ammonia is added to the reaction mixture at atmospheric pressure and when both the reactants of Formulas 2 and 3 are present, the ammonia is consumed by the formation of ammonium chloride almost spontaneously. When the chloro-compound is added to the siloxanediol solution, the solution, as previously noted, is first permeated with ammonia. Completion of the reaction, in either case, may be noted by the more rapid rate of ammonia evolution from the surface of the solution without a change in the rate of introduction. When both the siloxanediol and the chloro-compound are present in the solvent, the ammonia is added at a rate such as to maintain the desired reaction temperature.

The reaction can be conducted at temperatures ranging from room temperature (20°–30° C.) to the boiling point of the lowest boiling member in the reaction mixture, exclusive of the ammonia. For example, when dimethyldichlorosilane is used, the limiting temperature is 70° C. However, a preferred temperature range is from 40 to 50° C. and this may be achieved through proper utilization of the heat generated by the exothermic reaction. The rate of addition of ammonia is in part determinative of the temperature reached during the reaction. When both the siloxanediol and the chloro-compound are present, the reaction will proceed as fast as ammonia is added. Adding the ammonia too fast will cause the reaction mixture to overheat and the rate of addition should be regulated to maintain the temperature in the preferred 40–50° C. range. To maintain this temperature, the reaction should be conducted over a period of from about 30 minutes to 5 hours. Nothing is required in the reactant mixture except for the siloxanediol, the chloro-compound, the solvent, and the acid-accepting ammonia gas.

Following reaction, the material is washed or filtered to remove the ammonium chloride formed during the reaction and the solvent is then distilled from the product cyclopolysiloxane. Following this treatment, the solution is dried by any of the standard methods, such as by adding a desiccant, e.g., sodium sulfate, to the solution. Additionally, when solvents such as benzene are used, an azeotropic distillation may be run to remove the water from the reaction mixture. The resulting solution is filtered to remove the drying agent and a distillation is conducted at a pressure of about 30 mm. of mercury to remove the solvent.

In this step of the procedure, in particular, the use of ammonia is extremely advantageous as compared with the use of amines, especially tertiary amines. When the by-product ammonium chloride is removed by washing the solution, removal is more complete and more easily accomplished as the ammonium chloride is soluble in water, but insoluble in the organic solvent, and thus easier to remove than tertiary amine salts, such as pyridine hydrochloride, which are soluble in both phases. The advantage is even more striking when the solution is not washed to remove by-products, but the by-products are instead filtered from the reaction mixture. The ammonium chloride is insoluble in the organic solvents in which the reaction is conducted and thus may be filtered from the solution prior to distillation of the solvent. This eliminates the washing and drying steps and their concomitant problems.

Following distillation for removal of the solvent, whether the water wash or simple filtration method of recovery is used, the cyclopolysiloxane can be purified by recrystallization or fractional distillation. Generally the recrystallization is conducted in an alcoholic or hydrocarbon solvent. Among the solvents which can be used are ethanol, isopropanol, and hexane. The fractional distillation is conducted at a pressure of 2 mm. or less.

Yields of the cyclopolysiloxane utilizing ammonia as the acid-acceptor range from about 65 to 90%, based on theoretical, of the purified product which is comparable with yields utilizing the prior art acid-acceptors. However, because of the much lower costs of ammonia, the process of the present invention offers economic advantages.

The following specific examples of the process of the present invention are given as illustrations only, and should not be considered as limiting in any way the full scope of the invention as covered by the appended claims.

EXAMPLE 1

Preparation of 1,1,3,3 - tetraphenyl-5,5-dimethylcyclotrisiloxane

A one liter, 3-necked flask was equipped with a magnetic stirrer, thermometer, and a gas dispersion tube connected to a supply of ammonia gas. A solution was prepared in the flask containing 400 ml. of dry benzene, 41.4 g. (0.1 mole) of sym-tetraphenyldisiloxanediol

and 12.9 g. (0.1 mole) of dimethyldichlorosilane

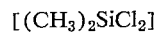

The contents were warmed slightly to effect solution and sufficient ammonia to permeate the solution was then introduced slowly, with stirring, over a 3-hour period. Following ammonia addition, the benzene layer was washed several times with water, dried over anhydrous sodium sulfate, and filtered into a flask. A vacuum distillation was then conducted to remove the solvent and yielded 47 g. of crude, crystalline cyclotrisiloxane. The crude product was recrystallized from a hexane-isopropanol mixture and yielded 38 g. (a yield of 81% based on theoretical) of a product having the formula,

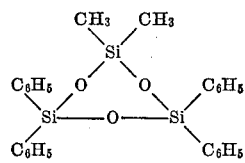

This correspond to Formula 1 where each R is phenyl, each R′ is methyl, $a$ is 2, and $b$ is 1. The product had a melting point of 87–89° C.

EXAMPLE 2

Preparation of 1,1,3,3-tetraphenyl-5-ethyl-5-methylcyclotrisiloxane

In a small flask a solution was prepared containing 200 ml. of dry benzene and 41.4 g. (0.1 mole of sym-tetraphenyldisiloxanediol [HO(C$_6$H$_5$)$_2$SiOSi(C$_6$H$_5$)$_2$OH]. The solution was stirred and saturated with ammonia. The treatment with ammonia was continued in an amount sufficient to permeate the solution, while 14.3 g. (0.1 mole) of methylethyldichlorosilane [(CH$_3$)(C$_2$H$_5$)SiCl$_2$] was added dropwise over a one-hour period. This mixture was stirred for an additional hour and the product recovered as described in Example 1. A 68% yield of a product having the formula,

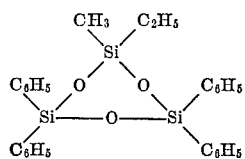

was recovered. This corresponds to the product of Formula 1 where each R is phenyl, one R′ is methyl, the other R′ is ethyl, $a$ is 2, and $b$ is 1. The cyclotrisiloxane had a melting point of 70° C. and its structure was confirmed by infrared analysis.

EXAMPLE 3

Preparation of 1,1,3,3-tetrachlorophenyl-5-methyl-5-phenylcyclotrisiloxane

An apparatus is set up corresponding to that described in Example 1. A solution is prepared containing 400 ml. of dry toluene, 58 g. (0.105 mole) of sym-tetrakis-p-chlorophenyldisiloxanediol

and 19.1 g. (0.1 mole) of methylphenyldichlorosilane [(CH$_3$)(C$_6$H$_5$)SiCl$_2$]. The contents are warmed slightly to effect solution and sufficient ammonia to permeate the solution is introduced slowly, with stirring, over a 3 hour period. Following ammonia addition, the toluene layer is washed several times with water, dried over anhydrous sodium sulfate, and filtered into a flask. A vacuum distillation is conducted to remove the solvent and yields a product having the formula

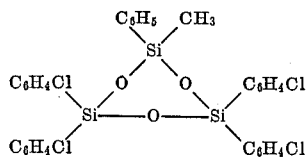

This corresponds to Formula 1 where each R is chlorophenyl, one R′ is methyl, the other R′ is phenyl, $a$ is 2, and $b$ is 1.

EXAMPLE 4

Preparation of 1,1-dimethyl-3,3,5,5,7,7-hexaphenylcyclotetrasiloxane

A 500 ml. flask equipped with a magnetic stirrer, gas inlet tube, and reflux condenser attached to a drying tube was set up. The purpose of the drying tube was to exclude moisture during the course of the reaction. A solution containing 24.5 g. (0.04 mole) of 1,1,3,3,5,5-hexaphenyltrisiloxane-1,5-diol in 250 ml. of anhydrous benzene was placed in a flask. To the siloxanediol solution was added 5.16 g. (0.04 mole) of dimethyldichlorosilane. A source of anhydrous ammonia was connected to the gas inlet tube and the ammonia slowly admitted to the flask at a rate sufficient to permeate the solution, over a period of about two hours. The slow ammonia stream was observed to cause an exothermic reaction with the simultaneous formation of a solid, ammonium chloride. At the end of two hours the addition of ammonia was not observed to generate additional heat. The reaction mixture was washed three times with water to remove the ammonium chloride, and the resulting solution was flash evaporated at a pressure of 20 mm. of mercury to a temperature of 50° C. to remove any volatiles present in the reaction mixture. A clear, viscous liquid resulted which, upon standing overnight, crystallized completely to a white solid. The crystalline product weighed 26.1 g., a yield of 98% based on the theoretical. The material was recrystallized twice from anhydrous ethanol and yielded pure 1,1-dimethyl-3,3,5,5,7,7 - hexaphenylcyclotetrasiloxane as determined by a melting point of 114–116° C. Additionally, an infrared spectrum of purified product of this example was identical to that obtained from a reference sample of 1,1-dimethyl-3,3,5,5,7,7-hexaphenylcyclotetrasiloxane. The yield of pure material was 19.0 g., 71% based on the theoretical. This product corresponds to Formula 1 where each R′ is methyl, each R is phenyl, $a$ is 3, and $b$ is 1.

It is clear that a feasible, economically advantageous process for forming cyclopolysiloxanes has been described by the present invention. The process is not only more economical because of the use of ammonia in place of previous more expensive amines, but additionally, the by-product formed utilizing ammonia is more easily removed from the final reactant solution than the amine-hydrogen halide salts produced in the processes of the prior art. Ammonia as an acid acceptor in the formation of certain cyclopolysiloxanes is usable with a wide variety of reactants.

While specific embodiments of the invention have been shown and described, the invention should not be limited to the particular formulas so shown. It is intended, by the appended claims, to cover all modifications within the spirit and scope of this invention.

What is claimed to be new and desired to be secured by Letters Patent of the United States is:

1. A method for forming cyclopolysiloxanes comprising reaction, in an anhydrous organic solvent solution, approximately stoichiometric amounts of:

(1) a first compound having the formula:

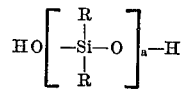

(2) a second compound having the formula:

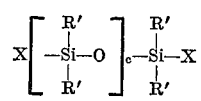

in the presence of ammonia as an acid acceptor, wherein ammonia is not added to said second compound in the absence of said first compound, and recovering the product having the formula:

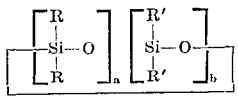

where each R is independently selected from the group consisting of aryl radicals, cyano-substituted aryl radicals and halogen-substituted aryl radicals, each R' is independently selected from the group consisting of alkyl radicals, aryl radicals, aralkyl radicals, and cyano and halogen-substituted aryl and alkyl radicals, and X is halogen; $a$ is an integer of from 2 to 3, inclusive, $b$ is an integer of from 1 to 2, inclusive, the sum of $a$ and $b$ is an integer of from 3 to 4, inclusive, and $c$ is an integer of from 0 to 1, inclusive.

2. The process of claim 1 wherein said first compound is sym-tetraphenyldisiloxanediol and said second compound is dimethyldichlorosilane.

3. The process of claim 1 wherein said first compound is sym-tetraphenyldisiloxanediol and said second compound is methylethyldichlorosilane.

4. The process of claim 1 wherein said first compound is sym-tetrachlorophenyldisiloxanediol and said second compound is methylphenyldichlorosilane.

5. The process of claim 1 wherein said first compound is 1,1,3,3,5,5-hexaphenyltrisiloxane-1,5-diol and said second compound is dimethyldichlorosilane.

References Cited

UNITED STATES PATENTS

| | | | |
|---|---|---|---|
| 3,268,570 | 8/1966 | Weyenberg | 260—448.2(E) |
| 3,297,632 | 1/1967 | Wu | 260—448.2X |
| 3,317,578 | 5/1967 | Prescott et al. | 260—448.2(E) |

TOBIAS E. LEVOW, Primary Examiner

P. F. SHAVER, Assistant Examiner

UNITED STATES PATENT OFFICE
CERTIFICATE OF CORRECTION

Patent No. 3,557,177       Dated June 23, 1971

Inventor(s)  Terry G. Selin

It is certified that error appears in the above-identified patent and that said Letters Patent are hereby corrected as shown below:

Column 1, line 4, insert -- assignor to General Electric Company, a corporation of New York --.

Signed and sealed this 7th day of December 1971.

(SEAL)
Attest:

EDWARD M.FLETCHER,JR.          ROBERT GOTTSCHALK
Attesting Officer              Acting Commissioner of Patent